Fig. 1

INVENTORS
DONALD S. REYNOLDS &
OTTO E. WERNER, JR.
BY
ATTORNEYS

Nov. 7, 1961 D. S. REYNOLDS ET AL 3,007,391
BREWING APPARATUS
Filed April 3, 1958 5 Sheets-Sheet 4

INVENTORS
DONALD S. REYNOLDS &
OTTO E. WERNER, JR.
BY
ATTORNEYS

3,007,391
BREWING APPARATUS
Donald S. Reynolds, Chicago, and Otto E. Werner, Jr., Skokie, Ill., assignors to Automatic Canteen Company of America, Chicago, Ill., a corporation of Delaware
Filed Apr. 3, 1958, Ser. No. 726,149
6 Claims. (Cl. 99—289)

This invention relates to a brewing apparatus, and more particularly to a brewing apparatus which is automatic in operation and especially useful in brewing coffee, although other uses and purposes will be apparent to one skilled in the art.

The brewing apparatus in general includes a device for dispensing a measured amount of brewing material into a brewing container or vessel within which a liquid is brewed from a brewing liquid and the brewing material. The brewed liquid is transferred from the brewing container to a storage or holding tank from which it may be subsequently dispensed.

The brewing apparatus of the present invention will be described herein in connection with the brewing of coffee, although it may be appreciated that other liquids may be brewed from this apparatus. Similarly, the dispenser of the brewing apparatus may be used to dispense measured amounts of any type of dry granular material, but will be designated for purposes herein as a coffee dispenser.

The coffee dispenser which supplies measured amounts of coffee to the brewing container at a predetermined time includes a reservoir which is supplied with coffee from a hopper arranged thereabove. A measuring chamber defined by a container extending downwardly from the reservoir is filled by a disc shaped member rotatably mounted in the reservoir. The disc shaped member is provided with a plurality of openings or holes and a raised portion blank in form, wherein the portion having the openings effectively conveys the coffee around the reservoir to the measuring container which is offset from the center of the reservoir. A gate is opened at the bottom of the measuring container to dispense a charge of coffee during the time that the raised blank portion of the disc shaped member passes over the upper open end of the measuring chamber. This arrangement eliminates packing of coffee in the reservoir and the measuring chamber thereby preventing malfunctioning of the dispenser.

The brewing container and operating components are simply constructed and arranged and include a brewing container rotatably mounted on a trunnion and driven by a motor. The brewing container is open at one end and provided with a cover which is automatically closed or opened depending upon the rotational position of the container. A cam shaft driven from the shaft of the motor, and therefore in timed relation with the driving of the container, is arranged to operate a predetermined number of switches as the brewing apparatus goes through a cycle of operation. The cycle of operation includes rotation of the container, with the cover removed, through an area where coffee grounds or brewing material may be dispensed into the container. Subsequent to closing of the container by causing the cover to be tightly sealed on the open end of the container, a swtich is operated by a cam to deenergize the motor and initiate the brewing cycle. The container is again rotated when the brewing cycle has been completed. Another switch is operated by the cam during this continued rotation which initiates the flushing cycle. The cover is removed from the open end of the container substantially simultaneously with the initiation of the flushing cycle. Subsequent to the flushing cycle, another switch is operated by the cam which stops or terminates the cycle of operation.

The brewing container includes a brewing basket having perforated side walls serving to separate the brewing material or coffee grounds from the brewed liquid or coffee. Accordingly, water is initially introduced into the interior of the brewing basket and into contact with the coffee grounds before it is then separated from the coffee grounds and passed through the perforated side walls of the brewing basket and out of the container to a holding tank. It is therefore necessary to properly introduce the water into the brewing basket, and this is accomplished primarily by a brew stem.

The brew stem also serves to hold the brewing basket within the brewing container, and therefore includes a threaded fitting at one end which is received in a threaded fitting in the bottom of the container. Liquid is supplied to the threaded fitting in the bottom of the container and through the bottom end of the stem which is hollow and forced radially outwardly through a plurality of radial apertures. An elongated sleeve is received freely on the stem and arranged to direct the flow of fluid upwardly along the stem from the apertures in the stem and into the central area of the brewing basket. Should any of the apertures become closed by coffee grounds, malfunction of the brewing container would result. Thus, it is seen that the brew stem must have the elongated sleeve for maintaining the apertures free from obstruction. Further, the elongated sleeve is restrained from moving too far along the brew stem when the container is inverted, but allowed to drop far enough so that the apertures in the brew stem may spray the liquid for flushing radially outwardly along the bottom of the brewing basket and container.

It is therefore an object of this invention to provide an improved brewing apparatus for automatically brewing coffee and the like, wherein the construction is economical and simple and easily maintained.

Another object of the present invention is in the provision of a brewing apparatus having a dispenser for dispensing brewing material, such as coffee grounds, wherein the construction is such as to eliminate any possibility of packing the material in the dispenser which would cause malfunction thereof.

Still another object of this invention resides in the provision of a dispenser for dispensing granulated material including a reservoir having a rotatable disc therein and a measuring container extending downwardly therefrom, wherein a rotating disc is so formed as to eliminate packing of the granulated material in the reservoir and the measuring container thereby giving greater overall efficiency and foolproof operation of the dispenser.

Another object of this invention is to provide a dispenser for dispensing granulated material, such as coffee or the like, in measured amounts, wherein the dispenser may be adjusted so that it dispenses a predetermined amount of material.

Another object of this invention is in the provision of a brewing apparatus including a brewing assembly which is simply and easily constructed, and compact in structure whereby it occupies a relatively small amount of space.

Still another object of this invention is to provide a brewing assembly for a brewing apparatus which includes a brewing container having its longitudinal axis extending along a slight incline during the brewing cycle thereby keeping the brewing material, such as coffee grounds from compacting in any one area within the container.

A further object of this invention is to provide a brewing apparatus having a brewing container wherein the brewing cycle is accomplished when the container has its longitudinal axis at a slight incline thereby preventing the brewing material, such as coffee grounds, from compacting in any one area within the container, and thereby permitting complete flushing of the coffee grounds during the flushing cycle and enhancing the more efficient operation of the apparatus.

A further object of this invention is in the provision of a brewing apparatus including a brewing container having a hot water inlet and a coffee outlet, wherein the inlet and outlet are arranged on the outside of the container in order to enhance maintenance thereof.

Another object of this invention is to provide a brew stem for use in a brewing container of a brewing apparatus having a fluid directing sleeve along the stem which is restrained from moving completely along the axis of the stem within predetermined limits in order to eliminate caking and clogging of the brewing material, such as coffee grounds in the apertures or openings in the stem and enhancing a more efficient operation of the brewing apparatus.

Other objects, features, and advantages of the invention will be apparent from the following detailed disclosure, taken in conjunction with the accompanying sheets of drawings, wherein like reference numerals refer to like parts, in which.

Figure 1:
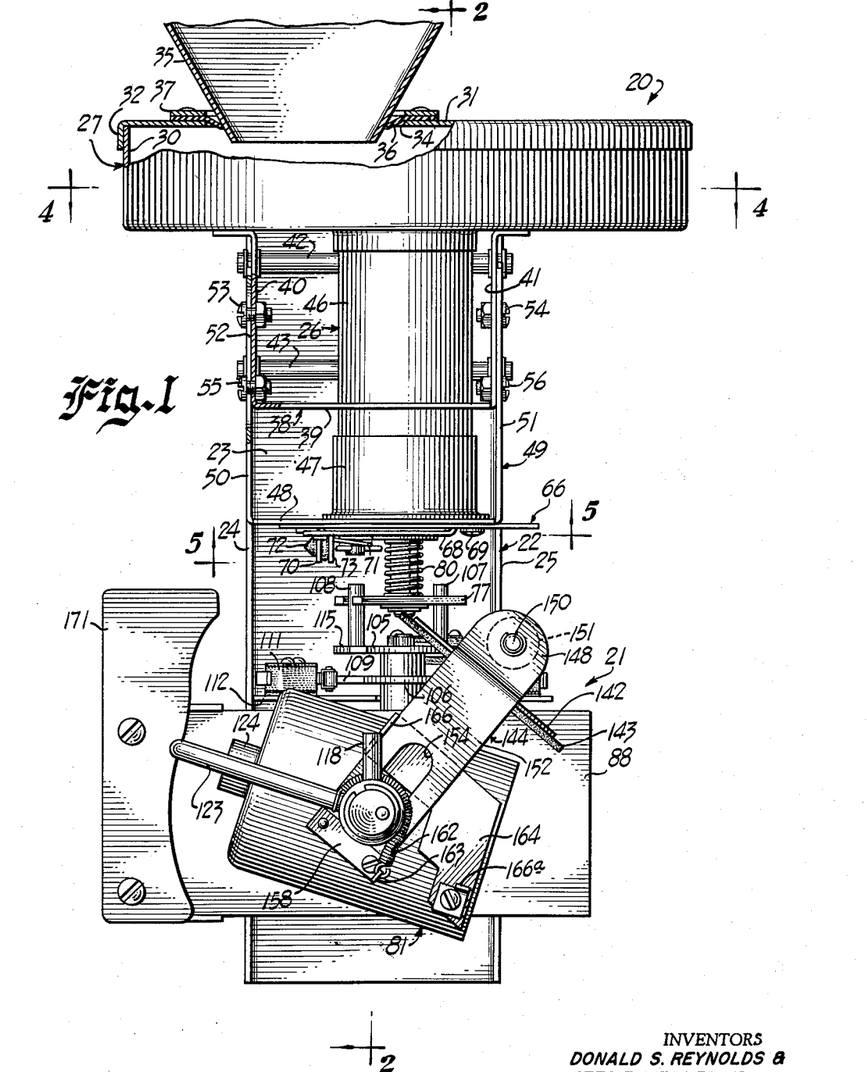
FIG. 1 is a front elevational view, with some parts broken away, of the complete brewing apparatus according to the invention.
Figures 2, 15:
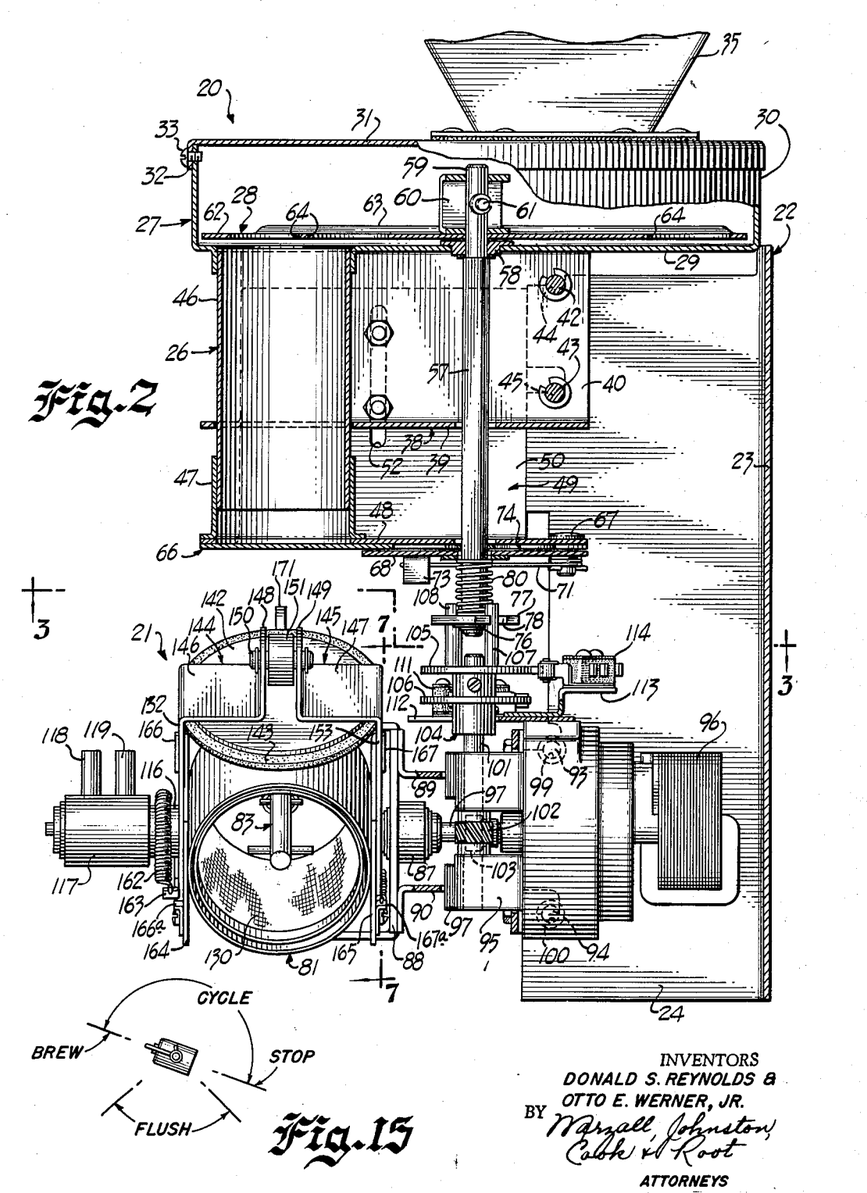
FIG. 2 is a vertical sectional view, taken substantially along line 2, 2 of FIG. 1.
FIG. 15 is a diagrammatic view, on a very small scale, of the cycle of operation of the brewing container according to the invention.
Figures 10, 11, 12, 13, 14:
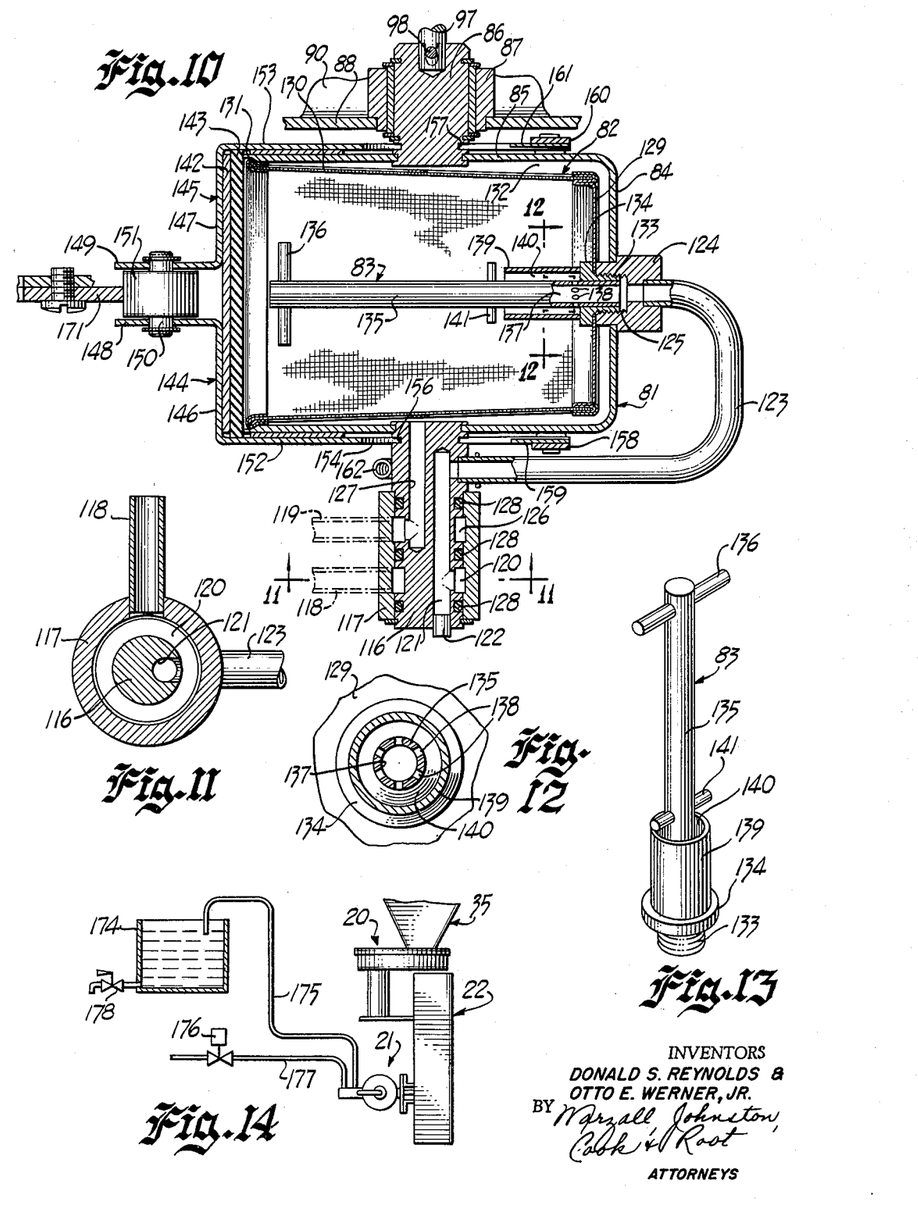
FIG. 10 is an enlarged longitudinal sectional view of the brewing container, taken substantially along line 10, 10 of FIG. 9.
FIG. 11 is an enlarged transverse sectional view taken substantially along line 11, 11 of FIG. 10.
FIG. 12 is a greatly enlarged transverse sectional view taken substantially along line 12, 12 of FIG. 10.
FIG. 13 is a perspective view of the brew stem according to the invention.
FIG. 14 is a somewhat diagrammatic view of the entire system in which the brewing apparatus of the present invention is utilized.

The brewing apparatus of the present invention includes generally a dispenser 20 for dispensing measured amounts of granulated material such as coffee, and a brewing assembly 21 for effecting the brewing to produce a brewed liquid such as coffee, arranged together as a unitary apparatus as seen in FIGS. 1, 2, and 14. The dispenser and brewing assembly are supported on a common channel-shaped frame member 22 (FIGS. 1, 2, 3, and 14). This frame member includes a vertical rear wall 23, and forwardly projecting side walls 24 and 25. The manner in which the dispenser and the brewing assembly are mounted on this frame member will be specifically set forth hereinafter in connection with the description of the devices.

Figure 4:
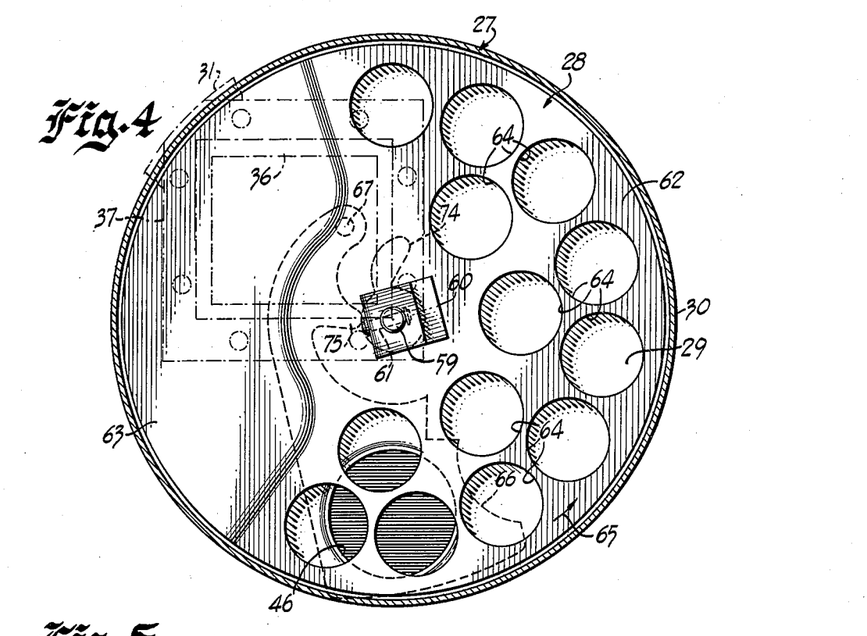
FIG. 4 is a horizontal sectional view of the dispenser reservoir, showing the rotating disc in top plan view, taken substantially along line 4, 4 of FIG. 1.

Referring now particularly to FIGS. 1, 2, and 4, the dispenser includes generally a measuring container 26 which measures a charge of coffee and dispenses the measured amount into the brewing assembly for a brewing cycle, a coffee reservoir 27 which holds a supply of coffee for filling the measuring device, and a rotating disc 28 within the reservoir serving to convey the coffee through the reservoir to the measuring device 26 and assuring a proper flow of coffee grounds between the reservoir and the measuring device.

The reservoir 27 is cylindrically shaped and includes a bottom wall 29 and an upstanding side wall 30. A removable cover 31 having a peripheral downwardly extending flange 32 is received over the open upper end of the reservoir in telescoping fashion, and may be temporarily secured thereto by a screw 33, FIG. 2. Preferably, this cover 31 fits rather tightly on the reservoir in order to maintain the freshness of the coffee, and if desired, a sealing gasket may be employed between the cover and the upper peripheral end of the side wall 30.

An opening 34, FIG. 1, is provided in the cover 31, and in this instance, substantially square in shape for freely receiving the discharge end of a hopper 35 that may supply coffee to the reservoir. In order to give a substantially airtight connection between the hopper and the reservoir, a flexible gasket 36 of rubber or the like is secured to the cover having portions extending inwardly of the opening for each of the side walls of the hopper 35 as seen in FIG. 1. A retaining member 37 may be riveted or otherwise secured to the cover to secure the gasket 36 thereto, as seen in FIG. 1. This connection between the hopper and the reservoir permits easy removal of the dispensing device for maintenance purposes should such be required.

The dispenser 20 is removably mounted to the frame member 22 by a U-shaped bracket 38 secured to the underside of the reservoir bottom wall 29 in any desirable manner. This bracket includes a bottom wall 39 extending horizontally and upstanding side walls 40 and 41, FIG. 1, which are bent over at their upper ends and secured to the reservoir. At the rear ends of the side walls 40 and 41, a pair of vertically spaced, parallel rods 42 and 43, FIG. 2, are arranged and secured to the side walls by any suitable manner. These rods are arranged to be received in arcuate seats 44 and 45 formed in the side walls 24 and 25 of the frame member 22, FIG. 2. The side walls 40 and 41 of the U-shaped bracket 38 are spaced to be received just inside the side walls 24 and 25 of the frame member 22 and thereby prevent any lateral motion of the rods with respect to the side wall and provide a stable and rigid supporting frame work for the dispenser. By merely lifting up the dispenser 20 and pulling it out away from the frame member 22, while also tipping it in order for the hopper 35 to clear the opening in the reservoir, the dispenser may be removed from the machine for servicing.

The bottom wall 29 of the reservoir is provided with an opening for receiving the upper end of the measuring device 26. The measuring device 26 includes an upper section 46 and a lower section 47 telescopically related thereto for providing an adjustable measuring chamber and increasing the flexibility of the dispenser. The sections are cylindrical in shape, although they may be polygonal if desired. The upper end of the upper section 46 may be secured to portions around the opening in the bottom wall 29 and this section extends through an opening provided in the bottom wall 39 of the U-shaped bracket 38. The lower section 47 is secured on the bottom wall 48 of a U-shaped bracket 49, FIG. 1. This U-shaped bracket includes upstanding side walls 50 and 51 slidably received on the outer surfaces of the upstanding side walls 40 and 41 of the U-shaped bracket 38 as seen in FIG. 1. These side walls 50 and 51 are provided with vertical slots 52 (only one shown in FIG. 1) wherein nut and bolt assemblies 53 and 54 provide a guided sliding relationship between the U-shaped bracket 49 and the U-shaped bracket 38. Lower nut and bolt assemblies 55 and 56 are arranged to be tightened or loosened for adjusting the lower U-shaped bracket 49 with the upper U-shaped bracket 38 and consequently providing a displacement of the lower section 47 relative to the upper section 46 of the measuring device. Thus, the volume of the measuring chamber may be changed when desired.

A shaft 57 extends vertically and is freely received through aligned openings provided in the U-shaped brackets 38 and 49 and is journalled at its upper end in a bearing 58 mounted in the bottom wall 29 of the reservoir 27 as seen in FIG. 2. The shaft is polygonally shaped in cross section, preferably square, and provided with a reduced cylindrical section 59 at its upper end which is received in the bearing 58 and protrudes into the reservoir. Spacers are provided above and below the bearing 58 and encircling the reduced portion 59 of the shaft, and the upper spacer serves to slightly raise the bottom surface of the rotary disc 28 above the bearing 58. The rotary disc 28 is provided with a center aperture which is received over the reduced end portion 59 of the shaft, and a substantially U-shaped member 60 has one of its legs secured to the upper side of the rotary disc 28, with both of the legs having aligned apertures in alignment with the opening in the rotary disc for receiving the cylindrical end portion 59 of the shaft as seen in FIG. 2. The bight portion of the U-shaped member 60 is provided with an aperture for receiving a pin 61 which also extends through a transverse bore in the reduced cylindrical portion 59 and is locked in place at opposite ends by locking rings in order to secure the rotary disc to the shaft 57 so that it will corotate therewith. Thus, driving of the shaft 57 effects rotation of the rotary disc 28 within the reservoir.

The rotary disc 28 includes a first section 62 spaced upwardly from the bottom wall 29 of the reservoir a certain distance, and a second section 63 spaced a greater distance upwardly from the bottom wall of the container to define a relatively raised portion from the section 62. The second section 63 defines an arcuate portion extending through approximately a 120° arc, while the first portion 62 comprises the remaining portion of the disc. The first section 62 is provided with a plurality of openings 64, FIG. 4, while the second section 63 is blank or impervious.

It may be noted in FIG. 4 that the inlet to the reservoir from the hopper 35 is arranged off-center from the reservoir and adjacent the rear thereof, while the opening in the bottom of the reservoir leading to the measuring device 26 is arranged off-center of the reservoir and to the front thereof. The disc 28 rotates counterclockwise as viewed in FIG. 4 and indicated by the arrow 65. The first section 62 with the openings 64 therein serves to convey the coffee or granular material within the reservoir and to the opening in the measuring device 26, while the second blank section 63 serves to cover the upper open end of the measuring device 26 when a charge of coffee is dispensed therefrom in order to prevent more coffee than a measured amount from being dispensed at any one time. Packing of coffee in the reservoir and the measuring device 26 may effect bridging and prevent the discharge of a proper measured amount of coffee from the measuring device. However, the rotary disc 28 with its first section 62 having a plurality of openings therein and a second section 63 being spaced a greater distance above the bottom wall 29 of the reservoir serve to prevent packing of coffee in the reservoir and the measuring device thereby permitting proper functioning of the dispenser at all times.

Figures 5, 6:
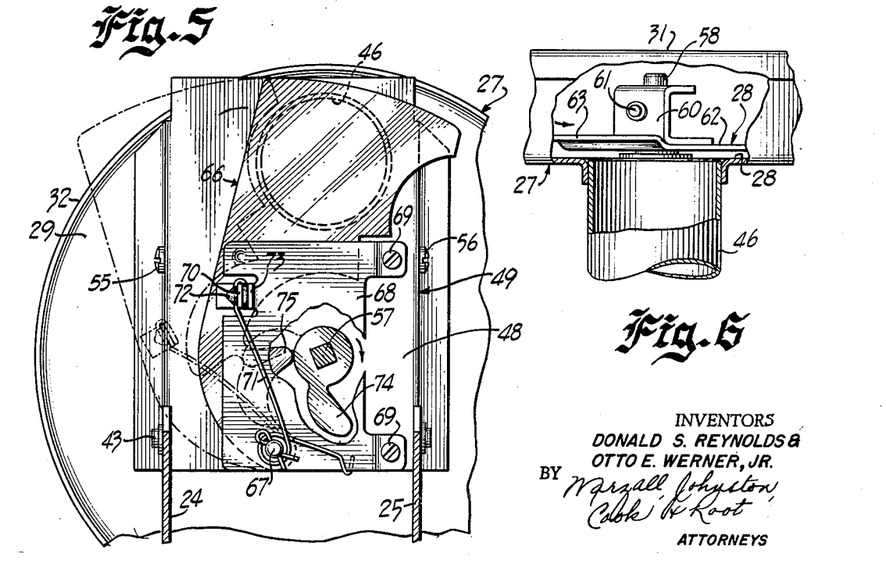
FIG. 5 is a bottom plan view of the dispenser, with some parts broken away and others fragmentary, taken substantially along line 5, 5 of FIG. 1.
FIG. 6 is an enlarged fragmentary view of a detail of the dispenser with parts broken away to show how the blank portion of the rotating disc is arranged relative to the bottom of the reservoir.

The discharge end of the measuring device 26 is selectively opened and closed by means of a gate 66, FIGS. 2, 4, and 5. This gate is flat in shape and pivoted at one end on a pin 67 and held in close contact with the underside of the lower wall 48 of the lower U-shaped bracket 49 by means of a guide plate 68, FIG. 5. The guide plate is secured at one side to the underside of the lower wall 48 by screw members 69, FIG. 5, thereby leaving unobstructed the other space between the guide plate and the lower wall 48. As noted in FIG. 5 the gate 66 is shown in solid lines when it is in closed position and in dotted lines when it is in open position. A lug 70 is struck from the gate 66 downwardly and has one end of a spring 71 attached thereto. The spring 71 coils about the pivot pin 67 and has its other end hooked over a remote edge of the guide plate 68 as seen in FIG. 5, whereby the gate 66 is normally biased to closed position. A rubber bumper 72 is carried on the lug 70 and normally abuts against a stop 73 which prevents the spring from forcing the gate beyond the lower open end of the measuring device 26 as seen in FIG. 5. This bumper further serves to absorb the shock imparted to the dispenser when the gate 66 is released after having been open to discharge the coffee from the measuring device.

The gate 66 is opened during each revolution of the rotary disc 25 in the reservoir by means of a camming finger 74, FIG. 5, which is mounted on the shaft 57 to rotate therewith and arranged between the bottom wall 48 of the lower bracket 49 and the guide plate 68. This camming finger 74 engages a cam lobe 75 integral with the gate 66, FIGS. 4 and 5, and thereby forces the gate 66 gradually to the open position illustrated by the dotted lines in FIG. 5. When the camming finger 74 has moved out of the path of the cam lobe 75, the spring 71 will snap the gate back to closed position. The camming finger 74 is arranged to open the gate 66 during the time which the imperforate second section 63 on the rotary disc 28 passes over the upper open end of the measuring device 26. Thus, as the camming finger 74 initially starts to open the gate 66, the upper end of the measuring device will be covered by the leading portion of the imperforate section 63 on the rotary disc and the gate 66 will be permitted to close prior to the time the trailing edge of the blank section 63 leaves the open upper end of the measuring device 26. Accordingly, an accurately measured charge of coffee will be dispensed at a predetermined time.

Figures 3, 7, 8, 9:
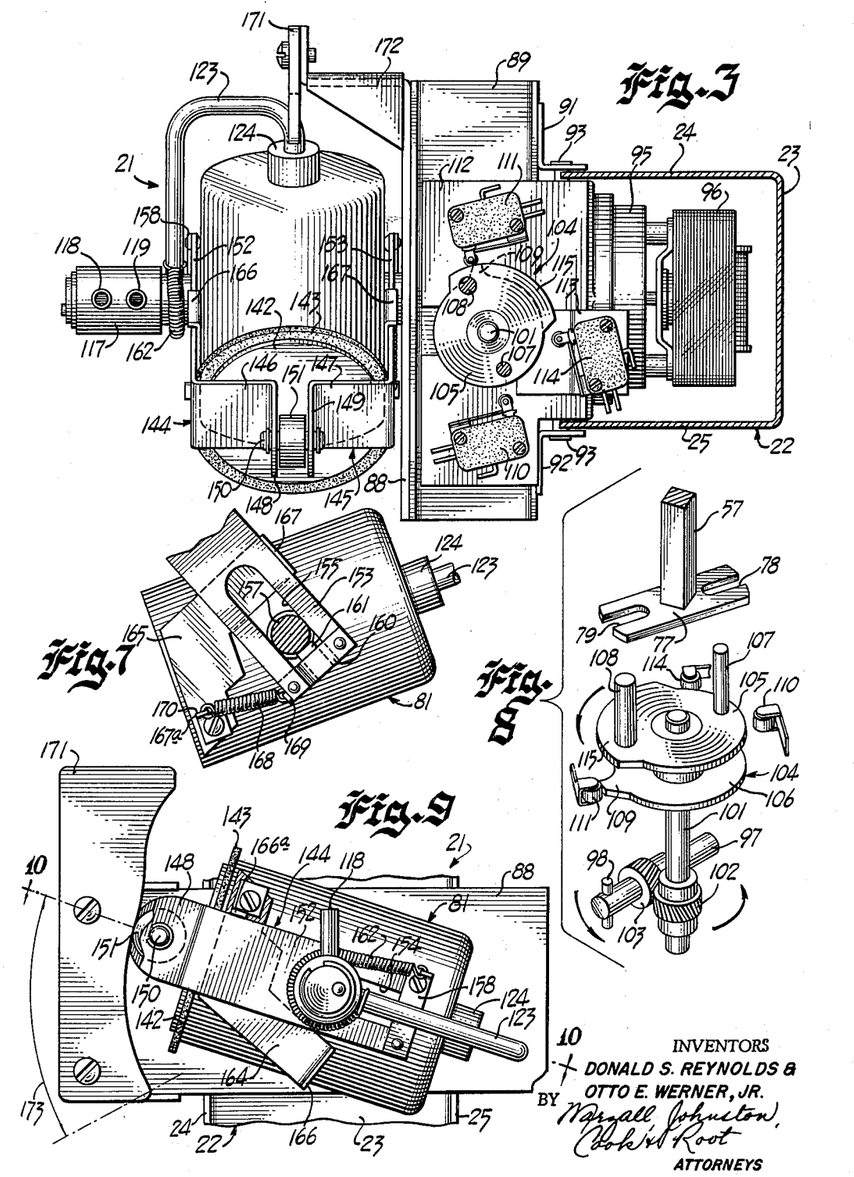
FIG. 3 is a top plan view of the brewing assembly, taken substantially along line 3, 3 of FIG. 2.
FIG. 7 is a view of the brewing container, taken substantially along line 7, 7 of FIG. 2.
FIG. 8 is an exploded view of the driving connection between the dispenser and the cam shaft of the brewing apparatus and illustrating the positions of the switches operated by the cams as well as the driving gear arrangement from the motor.
FIG. 9 is a front elevational view of the brewing container illustrating the container in the brewing position.

A retaining member 76 is mounted on the very lower end of the shaft 57 against which abuts a bar-shaped driven member 77, FIGS. 1, 2, and 8, having a slot 78 of one width at one end and a slot 79 of a greater width arranged diametrically opposite at the other end, FIG. 8. These slots engage driving pins which will be more clearly described hereinafter. A coil spring 80, FIGS. 1 and 2, encircles the shaft 57 and is arranged between the underside of the guide plate 68 on the upper side of the driven member 77 to maintain it at the lower end of the shaft.

It may be appreciated that the entire gate assembly is mounted on the lower U-shaped bracket 49 along with the lower section of the measuring device and moves together along the shaft 57 during adjustment of the capacity of the measuring device 26.

Referring now to the brewing assembly 21, this assembly includes generally a brewing container 81 having a brewing basket 82 arranged therein and held in place by a brew stem 83. The brewing container 81 is generally cylindrically shaped having a bottom wall 84 and a side wall 85, wherein the end opposite the bottom wall is open as seen in FIG. 10.

The brewing container is mounted to rotate about a horizontal axis and therefore is mounted on a trunnion at its inner side. The trunnion includes a member 86 secured at one end to the side wall 85 of the brewing container 81 and journalled in the bearing assembly 87 rigidly mounted in a vertical frame member 88, FIG.

10. Thus, the brewing container 81 is mounted for rotation on a single trunnion. Secured to the frame member 88 and extending rearwardly therefrom are upper and lower bracket members 89 and 90, FIG. 2, which are, in turn, secured to vertically extending and horizontally spaced angle bars 91 and 92, FIG. 3. Each angle bar has upper and lower supporting rods 93 and 94, FIG. 2, extending inwardly therefrom and secured to the casing of a reduction gear assembly 95. The reduction gear assembly is driven by a motor 96 and has a main driving shaft 97, FIGS. 2, 8, and 10, the forward end of which carries a transversely extending drive pin 98 and is received in a socket provided in the member 86 of the trunnion so that it will drive rotationally the brewing container 81, as seen in FIGS. 8 and 10.

The supporting rods 93 and 94 are received in slots formed in the side walls 24 and 25 of the main frame member 22 and held in place by upper and lower seats 99 and 100 formed in the side walls 24 and 25, FIG. 2. The entire brewing assembly can also be easily removed from the main frame member 22 for maintenance purposes or cleaning purposes in a manner similar to the handling of the dispenser 20.

A vertically extending cam shaft 101 is rotatably mounted in the upper and lower bracket members 89 and 90 and driven from the main drive shaft 97 through a helical gear 102 mounted on the cam shaft and engaging with a helical gear 103 mounted on the drive shaft, FIG. 8. The helical gears are provided with equal number of teeth, whereby one revolution of the drive shaft 97 causes the cam shaft 101 to also go through one revolution.

The cam assembly 104 is secured to the upper end of the cam shaft 101 for corotation therewith and includes upper and lower cams 105 and 106, respectively. The upper cam has extending upwardly therefrom and at diametrically opposite points driving pins 107 and 108 which are arranged to be slidably received in the slots 78 and 79 of the dispenser driven member 77 as seen in FIG. 8. It may be noted that the pin 107 is sized to be received in the slot 78, while the pin 108 is sized to be received in the slot 79, thereby precluding any chance of having the dispenser out of time with respect to the brewing assembly when mounting either of these units on the main frame member 22.

The lower cam 106 has a toothed-shaped cam lobe 109 which is arranged to engage at different times the brewing switch 110 and the stop cycle switch 111. Both of these switches are mounted on a horizontally extending mounting plate 112 which is secured to the casing of the reducing gear assembly 95 as seen particularly in FIG. 2. Thus, only the brew switch 110 and the stop cycle switch 111 are in the path of the lobe 109 of the lower cam 106. A Z-shaped bracket 113, FIG. 2, is mounted on the mounting plate 112 for mounting a flushing switch 114 at an elevation above the brewing switch and stop cycle switch so that it may be in the path of an elongated cam lobe 115 on the upper cam 105. Hence only the flush switch 114 may be actuated by the upper cam 105, while the brew switch 110 and stop cycle switch 111 are actuable by the lobe on cam 106. And for each revolution of the brewing container 81, the cam shaft 101 rotates one revolution and actuates each of the switches one time.

Referring now particularly to FIGS. 1 and 10, a cylindrically shaped fitting 116 is secured to a side wall 85 of the brewing container 81 diametrically opposite the member 86 of the trunnion. A sleeve member 117 is rotatably carried on the fitting 116 and provided with a pair of pipe connections 118 and 119. The pipe connection 118 serves as the inlet to the brewing container, whereby a brewing liquid such as hot water may pass therethrough to an annular inlet groove 120 formed in the fitting 116. The groove 120 communicates with an axially extending passageway 121 terminating short of the inner end of the fitting 116 and closed at its outer end by means of a plug 122 and the passageway 121 communicates with a pipe 123. The pipe 123 leads from the fitting 116 to a fitting 124 mounted in the bottom wall 84 of the brewing container 81. The fitting 124 has an internal threaded portion 125 which opens to the inside of the container.

The pipe or conduit connection 119 serves as an outlet for the brewing container 81 and aligns with an annular groove 126 formed in the fitting 116 and in communication with an axially extending passageway 127 which terminates short of the outer end of the fitting and opens into the interior of the brewing container 81. A plurality of conventional flexible O rings 128, FIG. 10, seal the grooves 120 and 126 from one another and also prevent leakage between the relatively rotatable fitting 116 and sleeve 117.

The brewing basket 82 includes an impervious bottom wall 129, FIG. 10, a tapered foraminous side wall 130 and a rigidifying ring 131 at its upper open end thereof. The rigidifying ring 131 is sized to intimately engage the upper inner surface of the side wall 85 of the brewing container. The foraminous wall 130 of the brewing basket defines with the inner surface of the side wall 85 of the brewing container a collecting chamber 132 which communicates with the passageway 127 in the fitting 116 that leads to the brewed liquid outlet 119.

The bottom wall 129 of the brewing basket 82 is apertured to permit insertion therethrough of the externally threaded nipple end of the brew stem 83. A collar 134 on the nipple 133 and integral therewith serves to lock the brewing basket bottom to the nipple 124 and the brewing container 81 as seen in FIG. 10.

The brew stem 83 also includes a stem portion 135 extending from the nipple end 133 and into the center portion of the brewing basket and container, the stem portion 135 being attached to the nipple 133 by suitable means such as welding. A transversely extending pin 136 is carried in the upper end of the stem portion 145, FIGS. 10 and 13, for grasping to insert and screw the brew stem into place. Likewise, removal of the brew stem may be easily accomplished by grasping the pin or handle 136 and screwing the stem outwardly for removal. The stem portion 135 is hollow or formed with a passageway 137, FIG. 10, but the passageway does not extend entirely through the stem portion, but terminates ahead of the top end of the stem portion. A plurality of radially arranged apertures 138 are provided in the stem portion 135 just above the collar 134, and through which the brewing liquid is dispersed from the inlet 118, as seen in FIGS. 10 and 12. A movable sleeve 139 is freely carried on the stem portion 135 and sized to define an annular passageway 140 between the outer surface of the stem portion and the inner surface of the sleeve. In normal brewing position, the sleeve rests on the collar 134, whereby the brewing liquid dispersed from the apertures 138 is forced to flow through the passageway 140 between the sleeve and the stem portion and into the central area of the brewing basket and brewing contained thereby evenly distributing the brewing liquid throughout the container.

During the flushing cycle when the brewing container is inverted, it is desirable to permit the flushing liquid to spray radially of the stem portion 135 and along the bottom of the brewing basket to flush along the inner surface of the foraminous wall 130. Accordingly, when in inverted position, the sleeve 139 will move downwardly a short distance to permit the flushing liquid to be dispersed radially from the brew stem and not then guided by the sleeve 139. However, in order to eliminate caking and clogging of the coffee grounds at the lower end of the brew stem and around the apertures 138, the sleeve 139 is restrained from falling to the opposite end of the stem portion 135 when in an inverted position by means of a retaining pin 141. Thus, the sleeve 139 is restrained from moving along the stem within predetermined limits. Because the coffee holding tank is at a higher level than the brewing container, FIG. 14, a slight head of coffee is built up in the line between the brewing container and the tank which at the beginning of the flushing cycle flows back through the line and through the brewing container to flush out any coffee grounds that may be in and around the apertures of the brew stem. Since the sleeve on the brew stem cannot travel to the upper end of the brew stem during the flushing operation, it immediately falls into proper place for protecting the apertured end of the brew stem when the brewing container is in operation thereby precluding the possibility of the sleeve being stuck at the upper end of the stem during the brewing cycle which would lead possibly to clogging of the apertures and malfunction of the brewing assembly.

The open end of the brewing container is closed during the brewing cycle by a cover 142. The cover is provided with a resilient gasket member 143, of neoprene rubber or the like, which is urged into sealing relationship with the upper edge of the brewing container side wall 85 as seen in FIGS. 9 and 10. The cover 142 is supported by a pair of similarly shaped but oppositely disposed Z-shaped plates 144 and 145. These plates include intermediate flat sections 146 and 147, respectively which are suitably secured to the top side of the cover 142. Extending upwardly away from the sections 146 and 147 are parallel spaced members 148 and 149, respectively, which have aligned apertures to receive a roller shaft 150 having a cam roller 151 rotatably carried thereon between the members 148 and 149.

Extending downwardly alongside of the container, when the cover is closed, from the intermediate sections 146 and 147, are legs 152 and 153, respectively, which are respectively provided with slots 154 and 155. The slotted leg 152 is slidably received in a groove 156, FIG. 10, formed in the fitting 116, while the slotted leg 153 is slidably received in a groove 157 formed in the member 86. Specifically, the slotted leg 153 is seen relative to the groove 157 in FIG. 7. The slots in the legs 152 and 153 extend from a point spaced downwardly from the intermediate sections 146 and 147 to the outer ends thereof. The outer end of the slot 154 is closed by a removable bar 158 having a stop 159 extending inwardly therefrom as seen in FIG. 10, while the outer end of the slot 155 is closed by a removable bar 160 having a stop 161 extending inwardly therefrom as seen in FIGS. 7 and 10.

The cover is normally biased to the position seen in FIGS. 1, 2 and 7 when it is open. This biasing is accomplished by a spring 162, FIGS. 1, 2 and 9, which has one end attached to the pipe or conduit 123 and is trained around the fitting 116 with its other end secured to a lug 163 on the bar 158 of the supporting leg 152.

At the opposite sides of the brewing container 81 cover positioning plates 164 and 165 are mounted and respectively provided with stops 166 and 167 for limiting the movement of the cover in its open position. On the inner side of the container as seen in FIG. 7, a spring 168 has one end connected to a lug 169 on the bar 160 of the inner leg 153 and its other end connected to a lug 170 on the cover positioning plate 165 for further biasing the cover to its open position.

For closing the cover, a cam plate 171, FIGS. 1 and 9, is mounted on the frame plate 88 and forwardly thereof by means of supporting brackets 172 as seen in FIG. 3. The cover cam rotor 151 engages the cam plate 171 and the portion of the cam marked by the line 173, FIG. 9, illustrates the area which maintains the cover in closed position.

The present invention may be employed in vending machines or in a unit by inself but will generally be combined with a coffee holding tank 174, FIG. 14, which receives the brewed coffee through a line 175 connected to the outlet of the brewing container. The brewed liquid will be supplied to the brewing container through a solenoid operated controlling valve 176 and a line 177 to the inlet of the brewing container. A manually operable valve or faucet 178 may be used to dispense the coffee from the holding tank 174. It may be noted that the holding tank 174 is positioned at a level higher than the brewing assembly 21 as seen in FIG. 14.

The operation of the brewing apparatus is automatic, wherein the switches 110, 111 and 114 are electrically connected in a circuit with the motor 96 and the solenoid operated valve 176. A signal is delivered to the circuitry to initiate operation of a cycle, during which a predetermined amount of coffee is brewed and delivered to the holding tank 174. The signal may be manually imparted to the circuitry or automatically imparted thereto by means of the sensing device in the holding tank which would sense a low level of coffee. Initially, the brewing container 81 resides in the position as seen in FIG. 1, wherein the longitudinal axis of the container is at a slight incline with the open end opening downwardly to permit drainage of any liquid that might remain in the container following the flushing cycle. It is noted that the cover 142 is in its open position. The cam lobe 109 on the lower cam 106 will also be in engaged position with the stop cycle switch 111 as seen in FIGS. 1 and 8.

Imparting of the signal to the circuitry of the apparatus operates to energize the motor 96 and rotate the brewing container 81 in a counterclockwise direction as viewed in FIG. 1. Simultaneously, the rotary disc 28 and the dispenser reservoir 27 will be rotated in a counterclockwise direction as viewed in FIG. 4. As the upper open end of the brewing container begins to align with the discharge end of the measuring device 26, the camming finger 74 on the dispenser shaft 57 will engage the cam lobe 75 on the gate 66 and initiate opening of the gate to permit the discharge of a measured amount of coffee grounds into the brewing basket 82 within the brewing container 81. During continued rotation of the brewing container 81 on its trunnion the gate 66 continues to open until the entire charge of coffee within the measuring device 26 has been deposited within the brewing basket 82. During the time that the measured charge of coffee is being dispensed from the measuring device 26, the blank second section 63 on the rotary disc 28 will be traveling over the top of the measuring container 26 to prevent any additional coffee grounds from dropping into the measuring device.

As the cam roller 151 on the cover 142 engages the leading edge of the cam plate 171, continued rotation of the brewing container 81 will initiate closing of the cover 142. Initially, the cover will be pivoted about the aligned member 86 and the fitting 116 until the supporting legs 152 and 153 engage the stops 166a and 167a, respectively. Continued rotation of the container will then cause the cover to move toward the open end of the container 81 until it is in sealed closed relation as seen in FIG. 9. When the cover is closed and the brewing container 81 has reached the position as seen in FIG. 9, the cam lobe 109 on the lower cam 106 will operate the brewing switch 110 thereby deenergizing the motor 96 and stopping the rotation of the container in the position as seen in FIG. 9 which may be defined as the brew position. It may be noted that this position is on a slight incline with the bottom end of the container extending downwardly which serves to keep the coffee grounds from compacting in any one area within the brewing basket 82.

Operation of the brewing switch 110 may also operate a timer and the solenoid control valve 176 to open this valve and permit the hot water or brewing liquid to be introduced into the brewing container and within the brewing basket. This brewing liquid will pass through the apertures 138 in the brew stem 83 and through the annular passageway defined by the sleeve 139 and brew stem portion 135 and into the middle of the brewing basket, where the brewing liquid can then contact the brewing material or coffee grounds. The resultant produced brewed liquid or coffee is then separated from the coffee grounds by the brewing basket 82 and discharged through the outlet 119 and to the coffee holding tank 174.

Termination of a predetermined timed period will cause the timer to operate in the circuitry and substantially simultaneously operate the solenoid controlled valve 176 to close the same and stop the flow of hot water to the brewing container and energize the motor 96 to again start rotation of the brewing container 81. It will be appreciated that the timer may be initially actuated at the time of initiating the automatic cycle instead of actuating the timer when the brew cycle switch has been operated.

The cover 142 remains in closed position during the traverse of the brewing container along the remaining part of the cam plate 171 as indicated by the line 173 in FIG. 9. Substantially simultaneously with release of the cover so that it will return to its open position, the elongated cam lobe 115 on the upper cam 105 will engage the flushing switch 114 and initiate the flushing cycle. During the flushing cycle, circuitry is operated to actuate the solenoid controlled valve 176 and permit the flow of flushing liquid through the brewing container. As above discussed, the sleeve 139 on the brew stem 83 will move to abutting position with respect to the retaining pin 141 and permit the flushing liquid to pass directly through the apertures 138 and radially of the bottom of the brewing container to wash down the walls of the brewing basket. The brewing container will continue rotation and the flushing cycle will be terminated when the trailing end of the cam lobe 115 leaves the switch 114. Shortly thereafter, the cam lobe 109 on the lower cam 106 will engage the stop cycle switch 111 and operate the circuitry to discontinue operation of the brewing apparatus. Thus, automatic operation of the brewing apparatus through each cycle of operation may be obtained. A diagrammatic illustration of the cycle of operation may be noted in FIG. 15.

It will be understood that modifications and variations may be effected without departing from the scope of the novel concepts of the present invention, but it is understood that this application is to be limited only by the scope of the appended claims.

The invention is hereby claimed as follows:

1. A brewing apparatus adapted to subject a brewing material to a brewing liquid to produce a brewed liquid and to separate the brewed liquid from the brewing material, said apparatus comprising a frame, a trunnion mounted in said frame to rotate about a horizontal axis, a shaft connected to said trunnion for driving same, a brewing container mounted on said trunnion to rotate therewith, said container having one end open and having a cover movable between open and closed positions therewith, means for driving said shaft and thereby rotating said container successively through a brewing material-receiving station, a brewing station and a flushing station, said brewing container having a brewing liquid inlet, a brewed liquid outlet and filter means to separate the brewing material from the brewed liquid, and means operable to move said cover to open and closed positions during a cycle of operation, said last named means comprising a spring connected to said cover and urging said cover toward open position, and a cam stationarily mounted on said frame in position to engage said cover when said container is disposed at said brewing station.

2. A brewing apparatus adapted to subject a brewing material to a brewing liquid to produce a brewed liquid and to separate the brewed liquid from the brewing material, said apparatus comprising a frame, a trunnion mounted in said frame to rotate about a horizontal axis, a shaft connected to said trunnion for driving same, a brewing container mounted on said trunnion to rotate therewith, said container having one end open and having a cover movable between open and closed positions therewith, said cover having a cam follower thereon, means for driving said shaft and thereby rotating said container successively through a brewing material-receiving station, a brewing station and a flushing station, said brewing container having a brewing liquid inlet, a brewed liquid outlet and filter means to separate the brewing material from the brewed liquid, cam means on said frame in position to engage said cam follower during rotation of said container to thereby move said cover to said closed position between said material receiving and brewing stations, and means operable when said container is at said brewing station to introduce a brewing liquid into said container through said inlet, said cam means operable to release said cover for movement to said open position upon rotation of said container to said flushing station, and means operable when said container is at said flushing station to flush the container.

3. A brewing apparatus adapted to subject a brewing material to a brewing liquid to produce a brewed liquid and to separate the brewed liquid from the brewing material, said apparatus comprising a frame, a trunnion mounted in said frame to rotate about a horizontal axis, a shaft connected to said trunnion for driving same, a brewing container mounted on said trunnion to rotate therewith, said container having one end open and having a cover movable between open and closed positions therewith, cam follower means on said cover and movable therewith, means for driving said shaft and thereby rotating said container successively through a brewing material-receiving station, a brewing station and a flushing station, said brewing container having a brewing liquid inlet, a brewed liquid outlet and filter means to seperate the brewing material from the brewed liquid, cam means on said frame operable through rotation of said container to engage said cam follower means and move said cover to said closed position between said material receiving and brewing stations, and means operable to substantially simultaneously stop rotation of said container at said brewing station, and to introduce a brewing liquid into said container through said inlet, the longitudinal axis of said container being inclined slightly from the horizontal at said brewing station, said cam means being operable to release said cover for movement to said open position upon rotation of said container to said flushing station.

4. A brewing apparatus adapted to subject a brewing material to a brewing liquid to produce a brewed liquid and to separate the brewed liquid from the brewing material, said apparatus comprising a frame, a trunnion mounted in said frame to rotate about a horizontal axis, a shaft connected to said trunnion for driving same, a brewing container mounted on said trunnion to rotate therewith, said container having one end open and having a cover movable between open and closed positions therewith, means for driving said shaft and thereby rotating said container successively through a brewing material-receiving station, a brewing station and a flushing station, filter means in said container for separating the brewed liquid from the brewing material, a fitting mounted on the outer side of said container coaxial with said trunnion, said fitting having a pair of axially extending passages therein, one of said passages intercommunicating a brewing liquid source with the side of said filter means containing the brewing material, and said other passage intercommunicating the other side of said filter means with a brewed liquid reservoir, cam means operable through rotation of said container to move said cover to said closed position between said material-receiving and brewing stations, means operable at said brewing station to introduce a brewing liquid into said container through said one passage, said cam means operable to release said cover for movement to said open position upon rotation of said container to said flushing station.

5. A brewing apparatus adapted to subject a brewing material to a brewing liquid to produce a brewed liquid and to separate the brewed liquid from the brewing material, said apparatus comprising a frame, a trunnion mounted in said frame to rotate about a horizontal axis, a shaft connected to said trunnion for driving same, a brewing container mounted on said trunnion to rotate therewith, said container having one end open, a cover mounted on said container and movable between open and closed positions over the open end thereof, means for normally biasing said cover to said open position, means for driving said shaft and thereby rotating said container successively through a brewing material-receiving station, a brewing station and a flushing station, said brewing container having a brewing liquid inlet, a brewed liquid outlet and filter means to separate the brewing material from the brewed liquid, cam means on said frame operable through rotation of said container to move said cover to said closed position between said material receiving and brewing stations, and means operable at said brewing station to introduce a brewing liquid into said container through said inlet, said cam means operable to release said cover so it can return to its open position upon rotation of said container to said flushing station.

6. A brewing apparatus adapted to subject a brewing material to a brewing liquid to produce a brewed liquid and to separate the brewed liquid from the brewing material, said apparatus comprising a frame, a trunnion mounted in said frame to rotate about a horizontal axis, a shaft connected to said trunnion for driving same, a brewing container mounted on said trunnion to rotate therewith, said container having one end open and having a cover movable between open and closed positions therewith, a roller mounted on said cover and movable therewith, means for driving said shaft and thereby rotating said container successively through a brewing material-receiving station, a brewing station and a flushing station, said brewing container having a brewing liquid inlet, a brewed liquid outlet and filter means to separate the brewing material from the brewed liquid, cam means on said frame operable through rotation of said container to engage said roller and move said closed position during movement of said container toward said brewing station, said cam means being operable to release said cover for movement to said cover to said open position upon rotation of said container to said flushing station, and means to charge said container with a measured amount of brewing material when the container is passing through the brewing material receiving station.

References Cited in the file of this patent

UNITED STATES PATENTS

| | | |
|---|---|---|
| 1,668,540 | McAllen | May 1, 1928 |
| 2,590,817 | Fenno | Mar. 25, 1952 |
| 2,660,340 | Thompson | Nov. 24, 1953 |
| 2,718,843 | Jones | Sept. 27, 1955 |